US009719776B2

United States Patent
Tayebati

(10) Patent No.: US 9,719,776 B2
(45) Date of Patent: Aug. 1, 2017

(54) FEATURE AND DEPTH MEASUREMENT USING MULTIPLE BEAM SOURCES AND INTERFEROMETRY

(71) Applicant: Parviz Tayebati, Sherborn, MA (US)

(72) Inventor: Parviz Tayebati, Sherborn, MA (US)

(73) Assignee: TERADIODE, INC., Wilmington, MA (US)

(*) Notice: Subject to any disclaimer, the term of this patent is extended or adjusted under 35 U.S.C. 154(b) by 167 days.

(21) Appl. No.: 14/676,070

(22) Filed: Apr. 1, 2015

(65) Prior Publication Data

US 2015/0276381 A1    Oct. 1, 2015

Related U.S. Application Data

(60) Provisional application No. 61/973,353, filed on Apr. 1, 2014.

(51) Int. Cl.
| | |
|---|---|
| *G01B 11/02* | (2006.01) |
| *G01B 11/06* | (2006.01) |
| *G01B 9/02* | (2006.01) |
| *B23K 26/03* | (2006.01) |
| *B23K 26/06* | (2014.01) |

(52) U.S. Cl.
CPC ........ *G01B 11/0608* (2013.01); *B23K 26/032* (2013.01); *B23K 26/0613* (2013.01); *G01B 9/02007* (2013.01)

(58) Field of Classification Search
CPC   G01B 11/0608; G01B 9/02007; G01B 11/06; G01B 21/18; B23K 26/032; B23K 26/0613
USPC ......................................................... 356/503
See application file for complete search history.

(56) References Cited

U.S. PATENT DOCUMENTS

| | | | | |
|---|---|---|---|---|
| 2001/0043336 | A1* | 11/2001 | Shitamich | G01S 17/08 356/614 |
| 2004/0002199 | A1* | 1/2004 | Fukuyo | B23K 26/0057 438/460 |
| 2010/0309482 | A1* | 12/2010 | Oikaze | G01B 11/2441 356/601 |
| 2011/0305256 | A1* | 12/2011 | Chann | G02B 27/0905 372/75 |
| 2012/0033697 | A1* | 2/2012 | Goyal | B82Y 20/00 372/45.01 |
| 2013/0188178 | A1* | 7/2013 | Keen | B23K 26/0066 356/122 |
| 2013/0301042 | A1* | 11/2013 | Urano | G01N 21/9501 356/237.5 |

* cited by examiner

*Primary Examiner* — Hina F Ayub
(74) *Attorney, Agent, or Firm* — Morgan, Lewis & Bockius LLP

(57) ABSTRACT

Systems and techniques for processing materials using wavelength beam combining for high-power operation in concert with interferometry to detect the depth or height of features as they are created.

21 Claims, 8 Drawing Sheets

FEATURE AND DEPTH MEASUREMENT USING MULTIPLE BEAM SOURCES AND INTERFEROMETRY

CROSS-REFERENCE TO RELATED APPLICATIONS

This application claims priority to and the benefit of U.S. Provisional Patent Application No. 61/973,353, filed on Apr. 1, 2014, the entire disclosure of which is hereby incorporated herein by reference.

FIELD OF THE INVENTION

In various embodiments, the present invention relates generally to beam-emission systems, and more particularly to systems and techniques for processing materials.

BACKGROUND

High-power lasers are used in many cutting, etching, annealing, welding, drilling, and soldering applications. An advantage to these systems is the precision with which cuts can be made and recesses etched into a wide variety of materials.

One challenge in implementing high-precision laser-based processing systems is determining the height or depth of a feature as it is formed. Material anisotropy, or even ordinary compositional variations across a nominally uniform material, can affect the amount of material removed by a laser at a given power level. Without real-time knowledge of feature depth or height during processing, and feedback capability to alter the beam in response thereto, it is impossible to guarantee precise dimensions that do not vary across the feature particularly if the feature extends across a considerable (e.g., more than a few microns) length, since the more material that is processed, the greater will be the likelihood of encountering compositional variations that affect material response.

SUMMARY

Embodiments of the invention provide systems and techniques for processing materials using wavelength beam combining for high-power operation in concert with interferometry to detect the depth or height of features as they are created.

Interferometry makes use of the principle of superposition to combine waves such that their combination is diagnostic of the original state of the waves. This works because when two waves with the same frequency combine, the resulting pattern is determined by the phase difference between the two waves—i.e., waves that are in phase will undergo constructive interference while waves that are out of phase will undergo destructive interference. Thus, depending on the height or depth of a feature in relation to the wavelengths of the incident radiation, some wavelengths, when combined with their reflections, will undergo these changes, which indicate the true depth/height of a feature—e.g., a cut, weld, or mesa. By utilizing a two-dimensional (2D) beam, the structure of a 3D feature can be determined. Feature information can be used in a feedback configuration to ensure that the entire feature remains uniform as it is created.

Accordingly, in a first aspect, the invention pertains to a system for processing a workpiece. In various embodiments, the system comprises a wavelength beam combining (WBC) emitter for emitting a multi-wavelength output beam comprising optical radiation having a plurality of wavelengths; a movable surface reflective to all of the wavelengths in the multi-wavelength output beam; a photodetector; a beamsplitter for (i) diverting a portion of the multi-wavelength output beam to the movable reflective surface and (ii) diverting a portion of a reflection of the multi-wavelength output beam from a surface of the workpiece to the photodetector, the photodetector being aligned with the movable reflective surface to receive therefrom a reflection of the diverted portion of the multi-wavelength output beam; and a controller, coupled to the WBC emitter device and the photodetector, for computing a height or depth of a feature on the surface of the workpiece based at least in part on a signal from photodetector.

The height or depth may be determined based on a distance between the beamsplitter and the surface of the workpiece. This, in turn, may be determined from the signal from the photodetector, which may indicate the degree of interference between the reflection of the multi-wavelength output beam from the surface of the workpiece and the reflection from the mirror of the diverted portion of the multi-wavelength output beam.

In various embodiments, wherein the controller is configured to control a parameter of the multi-wavelength output beam to maintain a target distance between the beamsplitter and the surface of the workpiece. For example, the controlled parameter may be one or more of power or beam parameter product. The WBC emitter may comprise a plurality of beam emitters each emitting a beam; a combining optical element arranged to receive the plurality of beams and cause a chief ray of each of the beams to converge along a beam-combining axis; a dispersive element, positioned along the beam-combining axis, to receive and transmit the converging chief rays; and a partially reflective output coupler arranged to receive the transmitted beams from the dispersive element, to reflect a portion of the transmitted beams toward the dispersive element, and to transmit the multi-wavelength output beam.

In another aspect, the invention pertains to a method for processing a workpiece. In various embodiments, the method comprises the steps of causing emission of an output beam from a WBC emitter, where the output beam comprises optical radiation having a plurality of wavelengths; diverting a portion of the output beam to a movable surface reflective to all of the wavelengths in the multi-wavelength output beam; diverting a portion of a reflection of the output beam from a surface of the workpiece to a photodetector; receiving, at the photodetector, a reflection from the movable reflective surface of the diverted portion of the output beam, the reflection including all of the wavelengths in the multi-wavelength output beam; and computing a height or depth of a feature on the workpiece based at least in part on a signal from the photodetector.

The height or depth may be determined based on a distance between the surface of the workpiece and a location where the portion of the reflection is diverted. For example, the signal from the photodetector may indicate a degree of interference between the reflection of the multi-wavelength output beam from the surface of the workpiece and the reflection, from the movable surface, of the diverted portion of the multi-wavelength output beam.

In some embodiments, the method further comprises the step of controlling a parameter of the multi-wavelength output beam to maintain a target distance between the beamsplitter and the surface of the workpiece. For example, the controlled parameter of the multi-wavelength output beam may be power and/or beam parameter product.

As used herein, the term "optical element" may refer to any of lenses, mirrors, prisms and the like which redirect, reflect, bend, or in any other manner optically manipulate electromagnetic radiation. The term "beam" includes any form of directed electromagnetic radiation, and may be single-wavelength or multi-wavelength. Beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, vertical cavity surface emitting lasers (VCSELs), etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams (i.e., each diode in the bar emits a single beam).

The term "substantially" or "approximately" means±10% (e.g., by weight or by volume), and in some embodiments, ±5%. The term "consists essentially of" means excluding other materials that contribute to function, unless otherwise defined herein. Nonetheless, such other materials may be present, collectively or individually, in trace amounts. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1A:
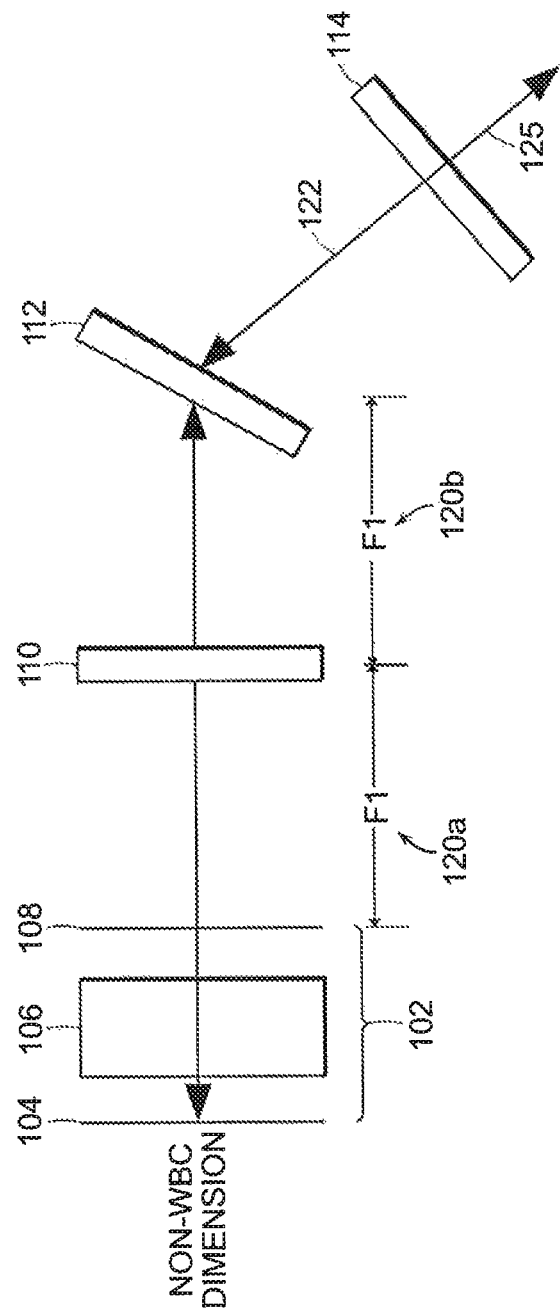
FIGS. 1A and 1B schematically illustrate a conventional beam-combining system that may be used to pattern or cut material.

Aspects and embodiments relate generally to beam sources that achieve high power and high brightness using wavelength beam combining (WBC). The approaches and embodiments described herein may apply to 1D and 2D beam-combining systems along the slow-axis, fast-axis, or other beam-combining dimension. In addition, the techniques may apply to external- and non-external-cavity WBC systems.

Representative WBC Systems

A conventional external-cavity 1D WBC system that may be utilized with embodiments of the present invention is shown in FIG. 1. The illustrated system utilizes a 1D bar 102 of diode lasers having a back-reflective surface 104, a gain medium 106 with two or more diode emitters, and a front reflective surface 108. The system also includes a combining optic 110 (e.g., a lens), a dispersive element 112, and a partially reflecting output coupler 114. The combining optic or lens 110 is located a focal distance 120a away from the front reflective surface 108 of the diode bar 102, and the dispersive element 112 is located a focal distance 120b away from the optic 110; typically, the focal distances 120a, 120b are identical and correspond to the focal planes of the optic 110. The output coupler 114 reflects a portion 122 of the generated beams to the dispersive element 112 and allows the remaining portion 125 to pass through as the system output.

Figure 1B:
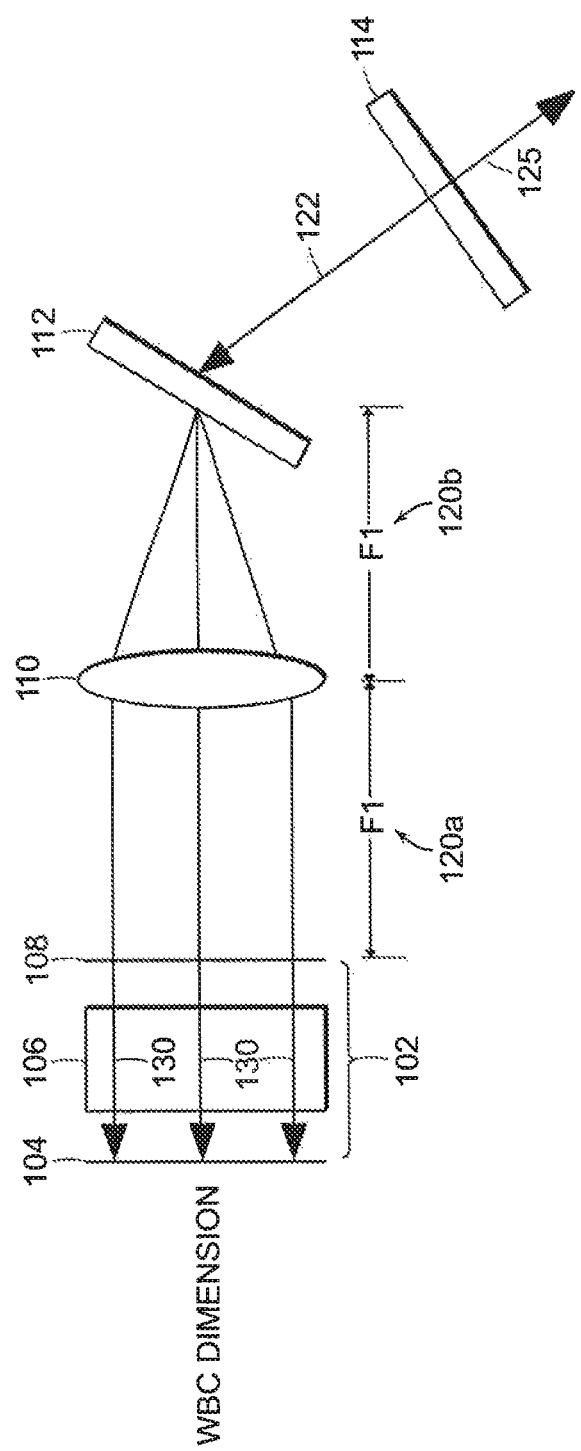

For explanatory purposes, FIG. 1A shows a single beam. In fact, the diode bar 102 generates a plurality of beams 130 as illustrated in FIG. 1B. The combining lens overlaps the chief rays from all of the emitting elements on the dispersive element 112, and collimates each beam in both axes orthogonal to the direction of propatation.

Figure 2A:
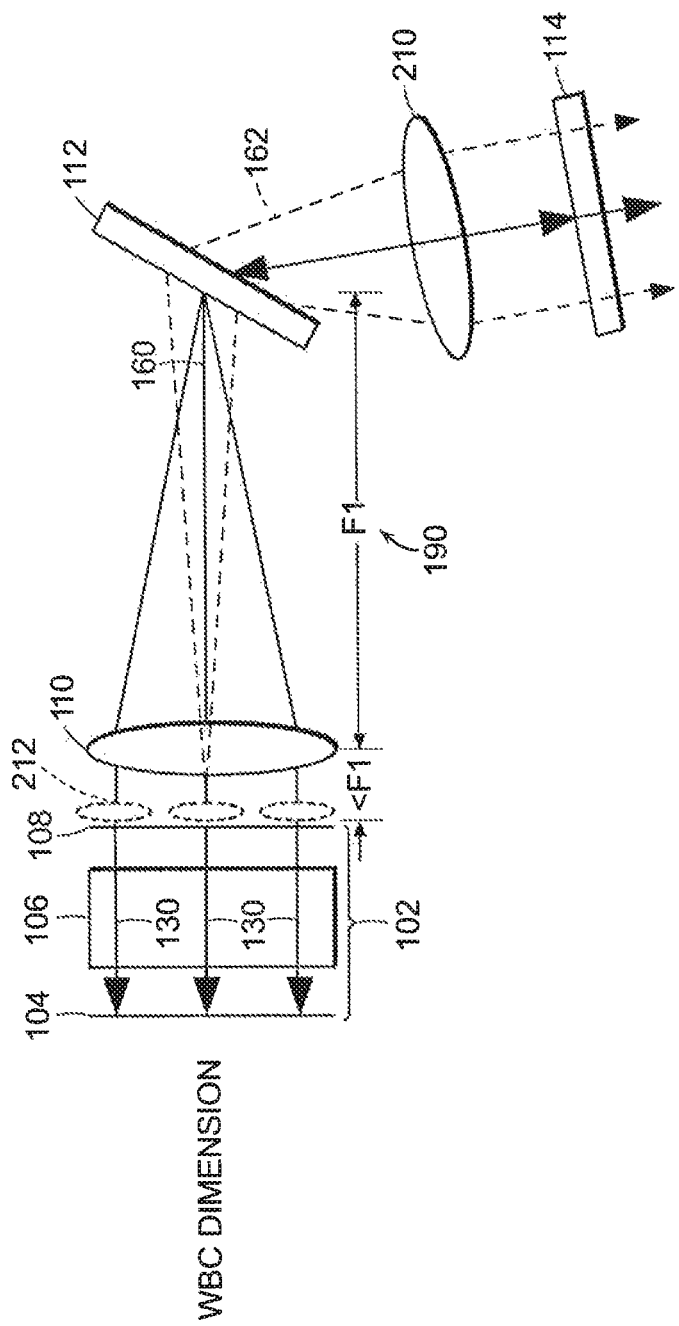
FIGS. 2A and 2B schematically illustrate shortened WBC systems with non-confocal combining optics.
Figure 2B:
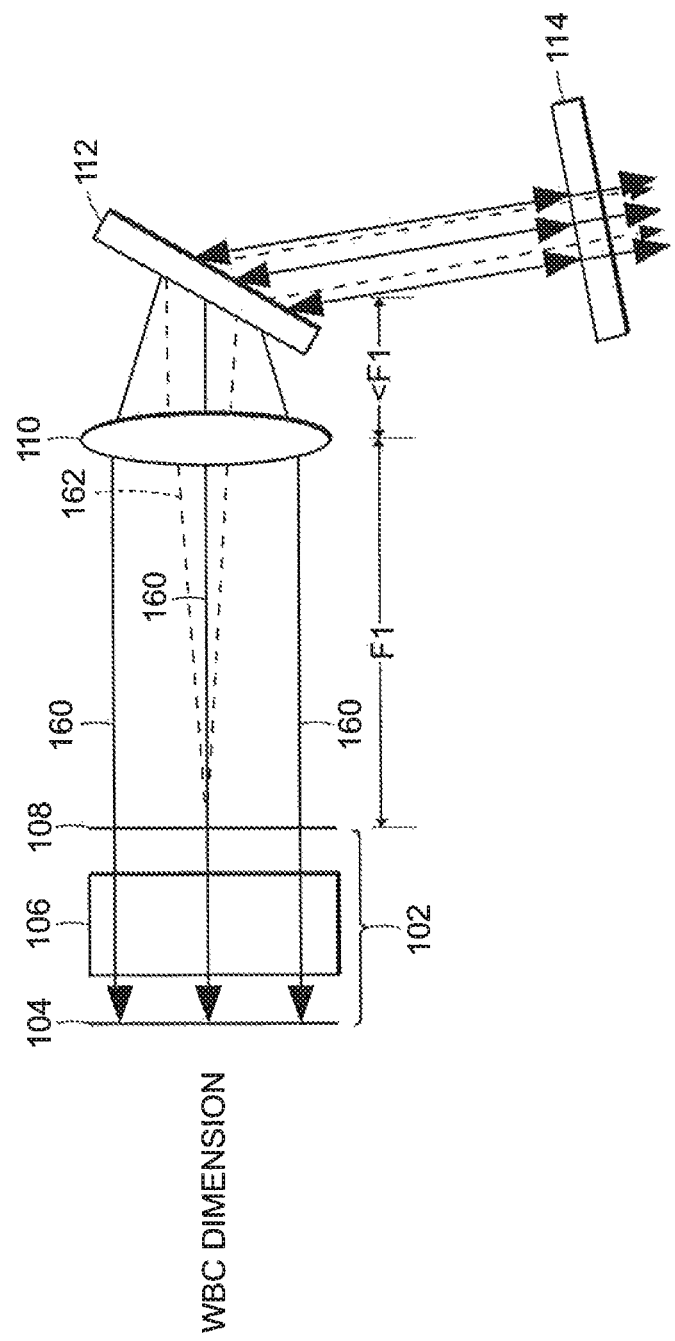

A more compact WBC system may be achieved as shown in FIGS. 2A and 2B by intentionally placing the diode bar 102 or the dispersive optic 112 at a position other than the focal plane of the combining optical element 110. If the combining optical element 110 is disposed less than a focal length from the diode bar 102, one or more additional collimating optics 210 may be located in front of or behind the dispersive element 112 and in front of the partially reflective output coupler 114. This arrangement can reduce the optical path length between the diode bar 102 and output coupler by almost a full focal length of combining element 110, particularly when the combining element 110 is placed adjacent to the front surface/facet 108 of the diode bar 102.

In a variation of this embodiment, also shown in FIG. 2A, a collimating optic 212 may be disposed in front of each emission point along the front surface/facet 108 of the diode bar 102 and in front of the combining optical element 110, which still results in a shortened WBC system. In this variation, the collimating optic(s) 212 may comprise or consist of an array of micro-optical fast-axis collimating (FAC) lenses, slow-axis collimating (SAC) lenses, or combination of both. By collimating each beam, proper wavelength stabilization feedback into each of the diode elements is ensured. This enables each emission element to produce a unique wavelength that is stabilized with less susceptibility to shifting, producing a multi-wavelength output beam profile of high brightness and power is achieved.

As shown in FIG. 2A, the dispersive element or diffraction grating 112 is placed substantially at the back focal plane of the lens 110. As drawn (the first approximation), the lens 110 with focal length F1 only converges the chief rays for each of the diode elements. This can be understood from the Gaussian beam transformation by reference to the lens equation:

$$\frac{1}{s + \frac{z_R^2}{s-f}} + \frac{1}{s''} = \frac{1}{f}$$

where s and s" are the input and output waist locations, $Z_R$ is the Raleigh range, and f is the focal length. Thus, the chief rays 160 are overlapping at the grating 112 while each individual beam is still diverging (as indicated at 162 by dashed lines). The diverging beams 162 may or may not be later collimated by an optical element, such as the optic 210. With all the diode element beams overlapped on the dispersive element 112, the output beam quality is generally that of a single emitter. Again, one advantage of this system is the size may be considerably smaller than, for example, a two-focal-length spacing between diode elements and the dispersive element 112. In some instances cases, the beam path is reduced by almost half or more. The spacing as described herein may be slightly longer, equal to, or slightly shorter than F1.

Alternatively, an embodiment devoid of collimating optic(s) 210 is illustrated in FIG. 2B. The combining optical element 110 is placed a focal length from the front facet 108 of the diode bar 102 and, as a result, collimates the light from each diode element. A reduced system size is still achieved by placing the dispersive element 112 less than a focal length away from the combining optical element 110. The brightness of the multi-wavelength beam is still increased as compared to the initial array of beams produced by the diode bar 102, but there may be some degradation in the output beam quality. In one variation of this embodiment, the diode elements 102 are a single 10-mm wide bar with 47 emitters. Each emitter may have a FAC lens (not shown) and no SAC lens. Inclusion of a SAC lens does not change the results. The focal length of the FAC lens in this variation may be 910 μm, and the diode bar may operate at a 1 μm wavelength. With each beam being diffraction-limited along the fast axis, the typical full divergence after the FAC lens is about 1 milliradian (mrd). Along the slow axis, the beam diverges about 100 mrd. We assume that the combining optical element 110 or transform lens has a focal length of 150 mm. The output beam quality $M^2$ is approximately:

$$M^2 = \frac{\pi\theta}{4\lambda}\sqrt{(zx/f)^2 + 1}$$

where λ=1 μm, z is the distance after the lens to the grating and center at the back focal plane, x=10 mm is the dimension of the array, and θ is the individual beam divergence after the grating.

Figure 2C:
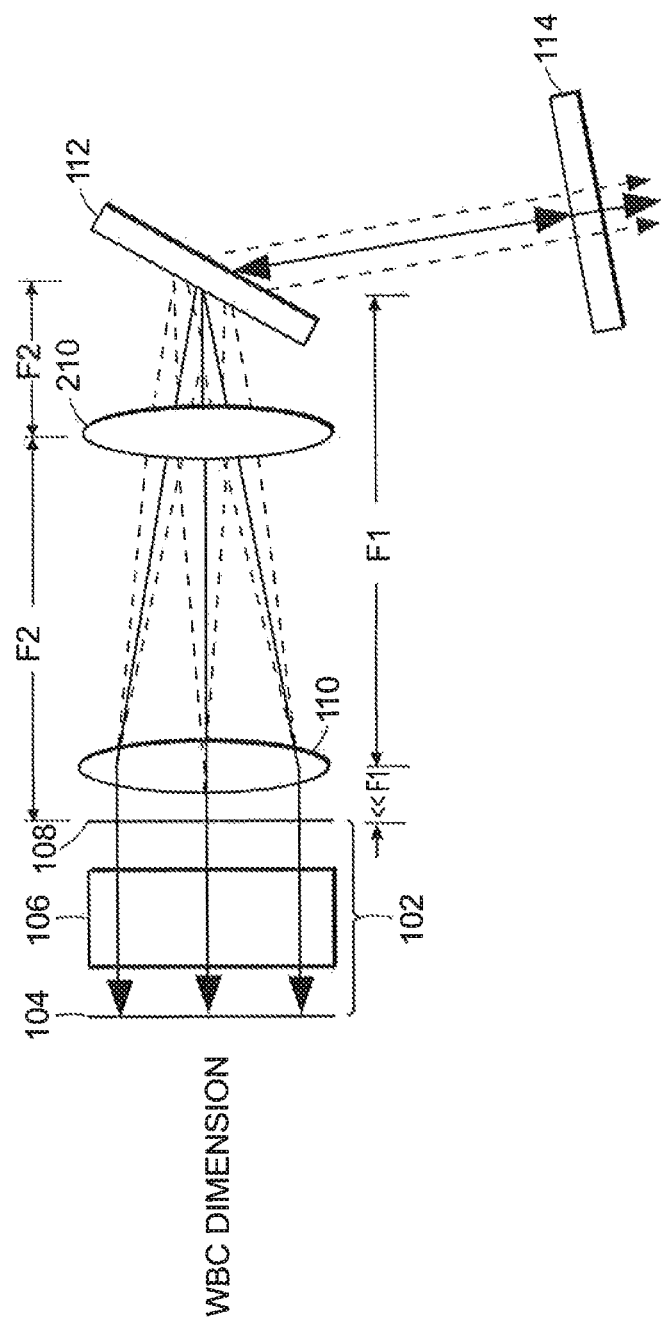
FIG. 2C illustrates a compact non-confocal dual lens WBC system.

FIG. 2C illustrates a WBC arrangement that enables a shortened beam pathway, and substantially separates the functions of combining chief rays and collimating diverging rays into two separate optical elements (or systems) positioned before the dispersive element 112. The combining element 210 is positioned at a distance substantially less than its respective focal length F1 away from the front aperture 108 on one side and approximately a focal length F1 away from the dispersive element 112 on the other side. This allows combining element 110 to direct the chief rays from each diode emitter of the diode bar 102 to overlap (or substantially overlap) on the dispersive element 112. At the same time, the collimating optical element 210 is placed approximately a focal length F2 away from the front aperture of each diode emitter on one side and a distance less than focal length F2 from the dispersive element 112 on the other side. The primary function of the collimating optical element 210 is to collimate the diverging rays. One skilled in the art will readily appreciate that both elements 110, 210 have optical power along the same dimension and as a result will have some effect on the physical placement of each optical element with respect to the front aperture and dispersive element. This interdependency may managed in part by placing the optical element 110 close to the emission aperture and the optical element 210 close to the dispersive element 112. This ensures that the combining optical element 110 primarily dominates the combining of the chief rays on the dispersive element 112, but is influenced by the prescription of the collimating optical element 210 and vice versa.

Figure 3:
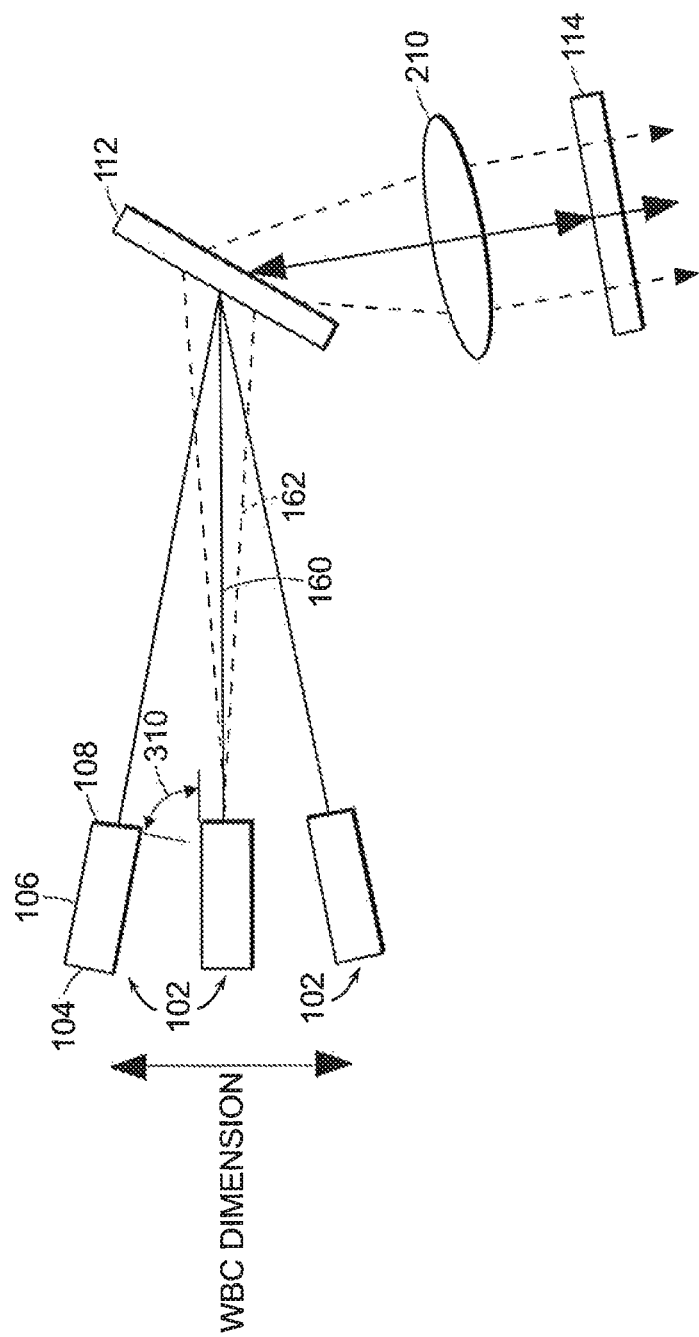
FIG. 3 illustrates a position-to-angle WBC system devoid of an optical combining element.

Other designs may reduce system size and even the need for optical combining elements through alternative position-to-angle methods. For example, FIG. 3 illustrates a WBC system devoid of an optical combining element. Each diode element 102 (which may have as few as a single diode emitter) may be mechanically positioned in a manner that the chief rays (solid lines 160) exiting the diode elements 102 overlap at a common region on the dispersive element 112 as shown. (In other variations of this embodiment, and similar to that shown in FIG. 2B, the beams do not completely overlap at the dispersive element, but the spatial distance between each along a combining dimension is reduced.) The diverging rays, illustrated by dashed lines 162, are collimated by collimating optic(s) 210 positioned between the dispersive element 112 and the partially reflective output coupler 114. (Some variations of this embodiment include replacing collimating optic 124 with individual FAC and/or SAC lenses positioned at the front surface or facet of each diode bar.) This embodiment thus increases brightness while reducing the number of optical elements required as well as reducing overall system size.

Figure 4:
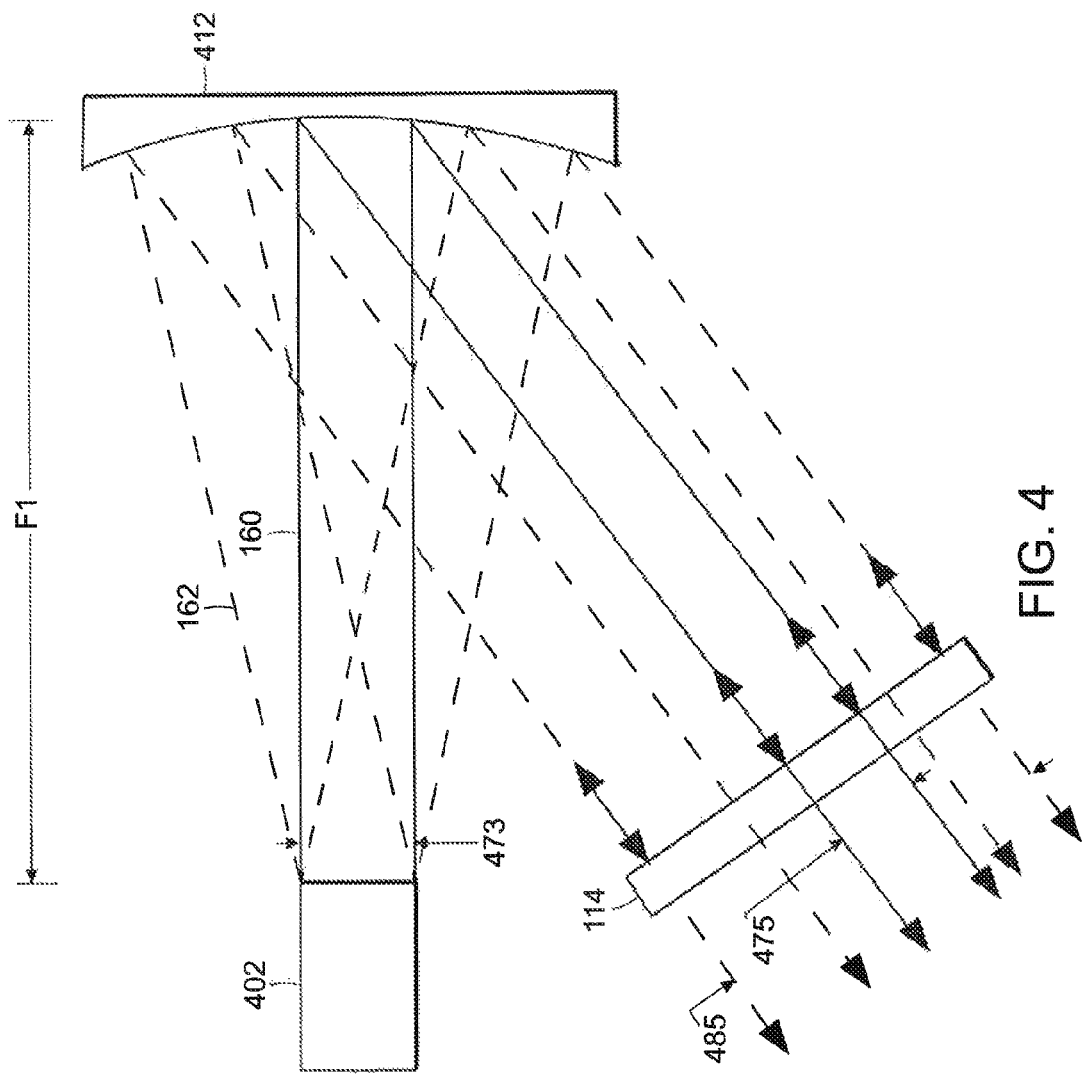
FIG. 4 schematically illustrates a WBC laser system using a curved grating to increase brightness.

In another embodiment, shown in FIG. 4, a curved diffraction grating 412 is placed a focal length F1 away from the diode bar 402. The curved diffraction grating 412 combines the emitted beams into a multi-wavelength beam that is transmitted to the partially reflective output coupler 114, which reflects a portion of the beams back towards the curved diffraction grating 412. The wavelengths of the reflected beams are then filtered by the diffraction grating 412 and transmitted back into each emitter of diode bar 102, whereby each emitter is stabilized to a particular wavelength. The maximum brightness produced by this type of system generally hinges on the amount of power the curved diffraction grating 412 can handle. This optical architecture reduces the number of optical elements and shortens the beam path while increasing the brightness of a multi-wavelength output beam. Degradation of the beam quality results as a function of the beam width 475 over the entire distance of the beam profile 485.

Combination with Interferometry

Figure 5:
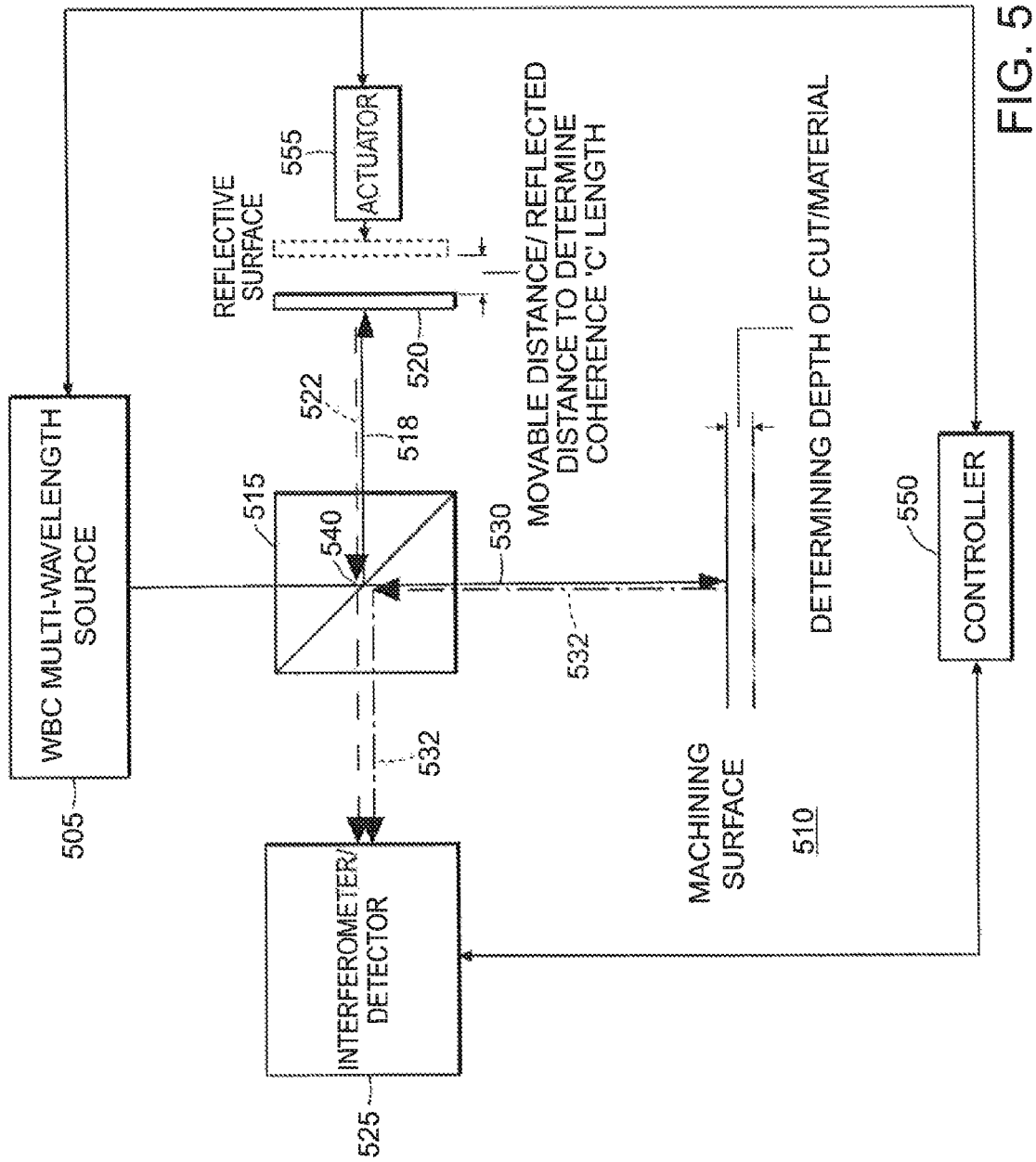
FIG. 5 schematically illustrates a feedback system for controlling laser operation in accordance with an embodiment of the invention.

Any of the foregoing optical architectures can be used in high-power materials-processing applications such as cutting, drilling, and patterning. In accordance with embodiments of the present invention, the output of the WBC source is passed through one or more elements creating an interferometric output that is analyzed to determine, in real time, the depth or height of the surface that the beam strikes. A representative architecture is shown in FIG. 5. The multi-wavelength beam output of any of the WBC systems shown in FIGS. 1-4 (and indicated at 505) is used to process a machining surface 510. The WBC system 505 provides an input for machining a surface 510 to create desired features or cuts. The beam passes through a beamsplitter cube 515 disposed between the multi-wavelength source and the machining surface 510. A portion 518 of the beam is diverted to a movable mirror 520 (e.g., a surface having a reflectivity ≥99%), which is configured for translation along the optical axis of the beam 518; thus, the mirror 520 can shift position to the location indicated in phantom. A portion 522 of the reflected beam is transmitted back through the beamsplitter 515 onto an interferometric detector system 525, where this beam portion 522 is used as a first reference for comparison. The portion 530 of the beam that passes directly through the beamsplitter 515 is transmitted onto the machining surface 510, where a portion 532 of the beam is reflected back to the beamsplitter 515 and then diverted onto the interferometric detector as a second reference to be compared with the first reference. In order to accurately determine the change of depth position of the cuts and/or welds on the machined surface, the lateral position of the reflective mirror 520 may be adjusted to match up with the coherence wavelength of one or more wavelengths. This occurs when the a wavelength undergoes constructive or destructive interference at the detector 525.

The wavelength or wavelengths that undergo interference depends on the difference between (i) the distance between the center point 540 of the beamsplitter 515 and the mirror 520 and (ii) the distance between the center point 540 and the surface 510. Accordingly, adjusting the position of the mirror 520 until one of the output wavelengths undergoes interference allows calculation of the distance to the surface 510 and, hence, the depth of a groove or the height of a feature relative to a baseline—i.e., a neutral level whose distance from the center point 515 was previously established. By utilizing a 2D array of beam sources and causing relative movement between the surface 510 and the beam 530, a 3D representation of the surface 510 can be built up.

The detector 525 may report the instantaneous depth/height information to a controller 550, which controls the operation of the WBC source 505 (i.e., it actives the source 505 and controls beam parameters as appropriate during processing). The controller 550 also operates a conventional positioning system to cause relative movement between the beam output of the WBC source 505 and the surface 510. The positioning system may be any controllable optical, mechanical or opto-mechanical system for directing the beam through a processing path along a 2D or 3D workpiece. During processing, the controller may operate the positioning system and the WBC source 505 so that the output beam traverses a processing path along the surface 510. The processing path may be provided by a user and stored in an onboard or remote memory, which may also store parameters relating to the type of processing (cutting, welding, etc.) and the beam parameters necessary to carry out that processing. In this regard, a local or remote database may maintain a library of materials that the system will process, and upon user selection of a material, the controller 550 queries the database to obtain, for example, a relationship between output power and cutting depth.

As is well understood in the plotting and scanning art, the requisite relative motion between the beam and the workpiece may be produced by optical deflection of the beam using a movable mirror, physical movement of the laser using a gantry, lead-screw or other arrangement, and/or a mechanical arrangement for moving the workpiece rather than (or in addition to) the beam. As the controller 550 receives real-time feedback regarding the depth or height of a feature, it alters the output power or other parameter of the WBC output beam (e.g., $M^2$, beam parameter product, etc.) so that the programmed height or depth is maintained notwithstanding variation in material properties. That is, the point on the surface 510 at which the distance to the center point 540 is computed may be just behind the beam (so that, e.g., the depth of the cut just made is measured). The controller 550 may also store, for example, power levels and corresponding cutting depths for calibration or to correct stored values.

The controller 550 also controls an actuator 555 for translating the mirror 520 along the axis of the beam 518. For example, the controller 550 may vary the lateral position of the mirror 520 until interference is detected by the detector 525, or until a particular wavelength undergoes interference.

The controller 550 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C#, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

The above description is merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for processing a workpiece, the system comprising:
   a wavelength beam combining (WBC) emitter for emitting a multi-wavelength output beam comprising optical radiation having a plurality of wavelengths;
   a movable surface reflective to all of the wavelengths in the multi-wavelength output beam;
   a photodetector;
   a beamsplitter for (i) diverting a portion of the multi-wavelength output beam to the movable reflective surface and (ii) diverting a portion of a reflection of the multi-wavelength output beam from a surface of the workpiece to the photodetector, the photodetector being aligned with the movable reflective surface to receive therefrom a reflection of the diverted portion of the multi-wavelength output beam;

a database storing parameters relating process types and material compositions to output-beam properties; and a controller, coupled to the WBC emitter device and the photodetector, for (i) computing a height or depth of a feature on the surface of the workpiece based at least in part on a signal from photodetector and (ii) controlling a property of the multi-wavelength output beam, in accordance with one or more parameters in the database, to process the surface of the workpiece to thereby form a feature in or on the surface of the workpiece.

2. The system of claim 1, wherein the height or depth is determined based on a distance between the beamsplitter and the surface of the workpiece.

3. The system of claim 1, wherein the signal from the photodetector indicates a degree of interference between the reflection of the multi-wavelength output beam from the surface of the workpiece and the reflection from the movable reflective surface of the diverted portion of the multi-wavelength output beam.

4. The system of claim 1, wherein the controller is configured to control a parameter of the multi-wavelength output beam to maintain a target distance between the beamsplitter and the surface of the workpiece.

5. The system of claim 4, wherein the controlled parameter of the multi-wavelength output beam is power.

6. The system of claim 4, wherein the controlled parameter of the multi-wavelength output beam is beam parameter product.

7. The system of claim 1, wherein the WBC emitter comprises:

a plurality of beam emitters each emitting a beam;

a combining optical element arranged to receive the plurality of beams and cause a chief ray of each of the beams to converge along a beam-combining axis;

a dispersive element, positioned along the beam-combining axis, to receive and transmit the converging chief rays; and a partially reflective output coupler arranged to receive the transmitted beams from the dispersive element, to reflect a portion of the transmitted beams toward the dispersive element, and to transmit the multi-wavelength output beam.

8. The system of claim 1, wherein the controller is configured to control a parameter the property of the multi-wavelength output beam to cut, etch, anneal, drill, solder, and/or weld the workpiece.

9. The system of claim 1, wherein the controlled property of the multi-wavelength output beam comprises at least one of power or beam parameter product.

10. The system of claim 1, wherein the feature has a height above the surface of the workpiece or has a depth below the surface of the workpiece.

11. A method for processing a workpiece, the method comprising the steps of:

causing emission of an output beam from a wavelength beam combining (WBC) emitter, the output beam comprising optical radiation having a plurality of wavelengths;

diverting a portion of the multi-wavelength output beam to a movable surface reflective to all of the wavelengths in the multi-wavelength output beam;

diverting a portion of a reflection of the multi-wavelength output beam from a surface of the workpiece to a photodetector;

receiving, at the photodetector, a reflection from the movable reflective surface of the diverted portion of the multi-wavelength output beam, the reflection including all of the wavelengths in the multi-wavelength output beam;

computing a height or depth of a feature on the workpiece based at least in part on a signal from the photodetector; and processing the surface of the workpiece with the multi-wavelength output beam to thereby form a feature in or on the surface of the workpiece, wherein the surface of the workpiece is processed based on stored parameters relating process types to properties of the multi-wavelength output beam.

12. The method of claim 11, wherein the height or depth is determined based on a distance between the surface of the workpiece and a location where the portion of the reflection is diverted.

13. The method of claim 11, wherein the signal from the photodetector indicates a degree of interference between the reflection of the multi-wavelength output beam from the surface of the workpiece and the reflection, from the movable surface, of the diverted portion of the multi-wavelength output beam.

14. The method of claim 11, further comprising the step of controlling a parameter of the multi-wavelength output beam to maintain a target distance between the beamsplitter and the surface of the workpiece.

15. The method of claim 14, wherein the controlled parameter of the multi-wavelength output beam is power.

16. The method of claim 14, wherein the controlled parameter of the multi-wavelength output beam is beam parameter product.

17. The method of claim 11, wherein processing the surface of the workpiece comprises at least one of cutting the workpiece, etching the workpiece, annealing the workpiece, drilling the workpiece, soldering the workpiece, or welding the workpiece.

18. The method of claim 11, wherein the surface of the workpiece is processed in response to user selection of a material composition of the workpiece.

19. The method of claim 11, wherein processing the surface of the workpiece comprises controlling a property of the multi-wavelength output beam in accordance with the stored parameters.

20. The method of claim 19, wherein the controlled property of the multi-wavelength beam comprises at least one of power or beam parameter product.

21. The method of claim 11, wherein the feature has a height above the surface of the workpiece or has a depth below the surface of the workpiece.

* * * * *